May 15, 1951  B. C. FLEMING-WILLIAMS  2,552,949
WAVE-FORM GENERATOR
Filed Feb. 24, 1948
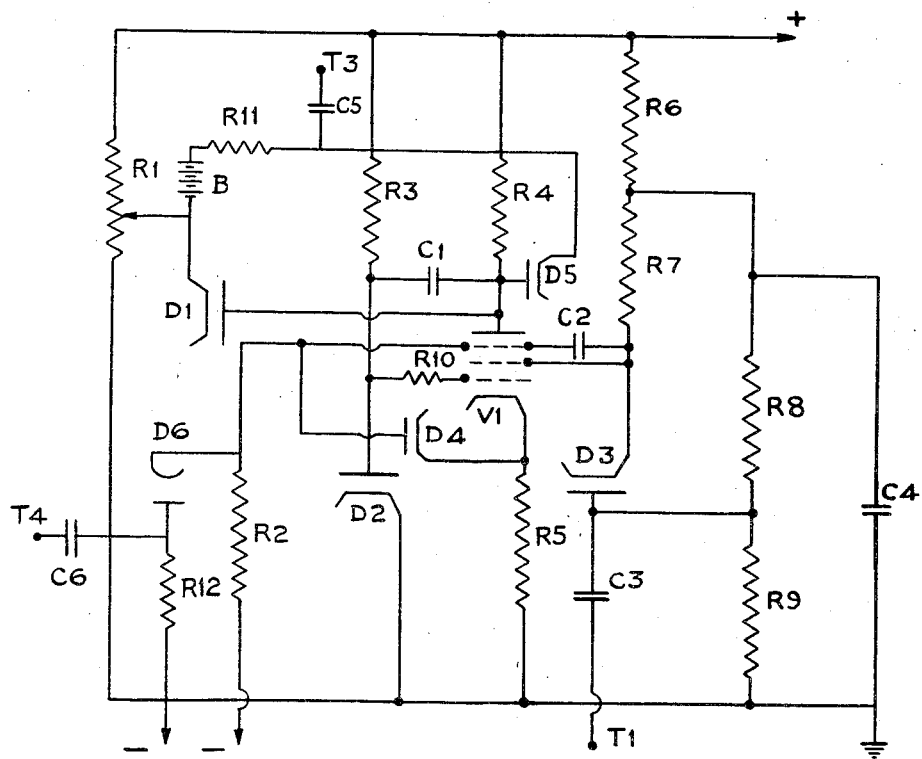
INVENTOR
Brian C. Fleming-Williams
By Ralph B. Stewart
Attorney Patented May 15, 1951

2,552,949

UNITED STATES PATENT OFFICE 2,552,949

WAVE-FORM GENERATOR

Brian Clifford Fleming-Williams, London, England, assignor to A. C. Cossor Limited, London, England, a British company Application February 24, 1948, Serial No. 10,386
In Great Britain April 19, 1944

Section 1, Public Law 690, August 8, 1946
Patent expires April 19, 1964

8 Claims. (Cl. 250—27)

This invention relates to thermionic valve circuits serving for the generation of linear potential sweeps and/or abrupt potential steps and being of the kind comprising a valve amplifier having a point in its anode circuit connected through a differentiating network to a point of constant potential, and having its input voltage derived from the output of this differentiating network, so that a substantially linear potential sweep of the valve anode is obtained.

A circuit of this kind according to the invention comprises a rectifier connected between one of the valve electrodes and a source of potential variations for firing whereby a potential variation may be applied to this electrode to initiate a potential sweep of the valve anode, and whereby this electrode is thereafter isolated from the firing source throughout the course of the anode potential sweep.

The accompanying drawing shows a circuit diagram of an arrangement embodying the invention, which, in response to the application of a firing pulse of potential, produces at one output terminal a single linear potential sweep followed by automatic return, and at another output terminal a single square wave cycle of potential.

The valve V1 is a pentode which may be of the Mazda AC/SP1 type.

The cathode of this pentode V1 is connected to earth through a biassing resistor R5.

The control grid and anode are coupled by a condenser C1, and the control grid is connected through a high resistance R3 to the positive line, which may be at 300 volts to earth, preferably stabilized. A small stopper resistance R10 is connected in the lead to the control grid to prevent parasitic oscillations. A diode D2 having its cathode connected to earth prevents the control grid potential from rising appreciably above that of earth.

The anode is connected to the positive line through an anode load resistor R4. It is also connected through a diode D1 to the slider of a potentiometer R1, which is connected between the positive line and earth. This prevents the anode potential from rising appreciably above the potential selected by the slider of potentiometer R1.

The screen and suppressor are coupled by a condenser C2. The screen current is derived from the positive line through resistors R6 and R7, the voltage across resistor R6 being smoothed by condenser C4 to earth. The suppressor is biassed through resistor R2 from a source which may be about 15 volts negative to earth.

A diode D4, connected between the suppressor and cathode of valve V1, is provided to prevent the suppressor potential from rising appreciably above that of the cathode.

Alternative arrangements are shown for the application of either positive-going or negative-going firing pulses to the circuit. Terminal T1, for the application of positive-going firing pulses, is coupled to the anode of diode D3 through condenser C3. This anode is normally biassed about 20 volts negative to its cathode so that the amplitude of the pulse must exceed this value before it becomes effective on the circuit. This bias is given by potentiometer R8, R9, which is connected between earth and the foot of resistor R6 and has the voltage across it smoothed by condenser C4.

The circuit has a stable condition with the anode approximately at the potential of the slider of potentiometer R1 and with the suppresser at the potential of its bias source. The whole of the cathode current of valve V1 is then flowing to its screen. The control grid is held approximately at earth potential by the diode D2, and the potential between cathode and control grid is therefore determined by resistor R5.

Suppose that a positive-going firing pulse is now applied at terminal T1 sufficient to overcome the bias applied between the electrodes of diode D3; then the potentials of the screen and suppressor are raised together. Anode current begins to flow in valve V1 at the expense of that which has been flowing in diode D1. When this becomes sufficient for diode D1 to be cut off, the potential of the anode of valve V1 begins to fall. Owing to the coupling between anode and control grid through condenser C1, the control grid is driven negative, with the results that diode D2 is cut off and that the cathode current of valve V1 is reduced. The screen potential therefore rises further, carrying the suppressor with it. The effect is cumulative and proceeds extremely rapidly until a meta-stable state is reached in which the anode current is approximately the sum of the currents through resistors R3 and R4. In this meta-stable state the current through resistor R3 is the current flowing to condenser C1.

During the change from the stable to the meta-stable state, the fall of anode and control grid potentials is not more than about 3 volts. At the same time the rise of screen potential may be about 60 volts. The suppressor potential is, however, prevented by diode D4 from rising appreciably above that of the cathode, and the condenser C2 therefore becomes charged. This charge leaks away slowly through resistor R2 during the subsequent cycle, but may leave the suppressor with considerably more negative bias at the time of arrival of the next firing pulse than is provided by its negative bias source alone. The suppressor is therefore to some extent automatically biassed and so the actual value of negative bias voltage applied is not very critical.

During the meta-stable regime the anode potential will make a linear sweep downward while the control grid potential makes an approximately linear sweep upward across a small portion of its grid base. The velocities of these potential sweeps are determined by the values of resistor R3 and condenser C1. The discharging rate of condenser C1 will approximately correspond to the discharging rate which it would have if connected in series with a resistance of value G times R3 across a direct voltage source of value G times the voltage of the positive line, G being the gain of the valve V1 as an amplifier in the present circuit. While these sweeps of the anode and control grid potentials proceed, the potential of the screen will remain approximately constant, and therefore that of the suppressor also because the time constant C2R2 is long relative to the duration of the sweep.

The termination of the meta-stable regime will occur automatically when the anode has reached a very low potential, because the current to the screen then increases with the result that screen and suppressor potentials both fall. The anode current is then cut off, and the anode potential proceeds to rise exponentially as condenser C1 is charged through resistor R4 and diode D2. Diode D2 prevents the potential of the control grid from rising above earth potential. When the anode potential reaches that of the slider on potentiometer R1, the stable condition is again established and the circuit is again ready for operation in response to a firing pulse. It will be evident that the potential selected by the slider on potentiometer R1 sets the amplitude of the anode potential sweep independently of the velocity thereof.

The firing pulse network shown in connection with terminal T1 has the advantage that, when one firing has occurred, an interval of time follows during which it cannot be caused again except by a still larger pulse than that which is determined by the value of the steady bias applied to diode D3. The cause of this effect is the temporary increase in bias due to the further charging of condenser C3 by the current which flows through diode D3 when firing occurs. The additional charge leaks away slowly through resistor R8.

Diode D3 serves to isolate, during the meta-stable regime, the generator circuit under consideration from the source (not shown), connected to the terminal T1 which provides the firing pulses.

This isolation prevents the possibilities that further potential variations in the firing source might either stop the anode potential sweep or at least spoil its linearity. It also prevents the generator circuit from reacting upon the firing source.

Terminal T3 and the network associated therewith, including diode D5, provide an arrangement for applying negative-going firing pulses to the circuit. This network will normally be provided only as an alternative to, and not in addition to the network comprising terminal T1 and diode D3.

Negative-going firing pulses applied at terminal T3 reach the anode of pentode V1 by passing through coupling condenser C5 and diode D5. In view of the fact that the tapping of potentiometer R1 is adjustable, a separate D. C. source B is employed to provide bias for diode D5, in order that negative-going firing pulses applied at terminal T3 shall be ineffective unless they exceed a predetermined minimum amplitude. Resistor R11 is provided to increase the impedance across which the firing pulse builds up.

When a negative-going firing pulse is applied to the anode of pentode V1, the transition from the stable to the meta-stable condition will proceed as a result of those same cumulative effects as have been described as the result of the application of a positive-going firing pulse from terminal T1 to the screen.

As with the network associated with terminal T1, an additional bias will be applied to diode D5 for a period after firing. This is due to the current which flows from condenser C5 through diode D5; and its duration will depend upon the time-constant C5, R11, governing the recharging of condenser C5.

Yet another alternative firing circuit is shown in connection with terminal T4, and this again will not normally be provided if either of the networks associated with terminal T1 or T3 is present.

Terminal T4 is used for positive-going firing pulses and these are applied through diode D6 to the suppressor of pentode V1, which serves as a second control grid, i. e. a grid controlling the division of current between anode and screen. If bias is desired, resistor R12 will be connected to a point of fixed potential more negative than that to which resistor R2 is connected. A temporary increase in bias, after firing, will again occur as a result of the discharge condenser C6 through diode D6, and its time of decay will depend on the time-constant C6, R12.

If no bias is required for the purpose of preventing small potential variations from firing the circuit, negative-going firing pulses may be applied at the cathode of diode D1. This avoids the necessity of providing any of the additional diodes D3, D5, D6. If this method is to be used, it will be preferable that a further resistor be inserted between the tapping on potentiometer R1 and the cathode of this diode to provide an adequate impedance for the firing pulse to build up on.

If it is desired to obtain linear potential sweeps as output from the circuit, these may be taken from the anode of valve V1. If abrupt potential steps are desired, these may be taken from the screen. The form of the wave front of the potential step is identical with that of the upper part of a positive firing pulse applied at terminal T1, provided that this pulse rises rapidly.

The following table gives a set of values for the various components of the circuit, suitable for use for generating linear potential sweeps and square waves of potential having durations of the order of 100 microseconds.

R1 = 25 kilohms
R2 = 1 megohm
R3 = 500 kilohms
R4 = 300 kilohms
R5 = 200 ohms
R6 = R7 = 10 kilohms
R8 = 150 kilohms
R9 = 100 kilohms
R10 = 500 ohms
R11 = 50 kilohms
R12 = 150 kilohms
C1 = 100 picofarads
C2 = 0.001 microfarad
C3 = 0.01 microfarad
C4 = 0.25 microfarad
C5 = 0.01 microfarad
C6 = 0.01 microfarad By appropriate alteration of the values of components, the duration of the generated potential sweep and square-wave may be lengthened to the order of several seconds.

The circuit described may be converted into a free-running time-base or square-wave generator by reducing the bias on the suppressor grid, and the firing arrangements described may then be used for synchronising.

I claim:

1. A thermionic valve circuit for the generation of linear potential sweeps and abrupt potential steps comprising an electron discharge tube having a cathode, an anode, a first control electrode, a screen grid between said control grid and anode and a second control electrode between said screen grid and anode, a source of potential, connections between said tube and said source for applying to said anode and screen grid potentials positive relative to said cathode, a resistor included in said anode connection, a second resistor and a condenser, a connection from said anode, through said second resistor and said condenser in series to the positive terminal of said source, a connection from the junction of said second resistor and said condenser to said first control electrode, a firing terminal to receive a potential variation for firing said tube and a rectifier having its anode connected to said terminal and its cathode connected to said second control electrode.

2. A circuit according to claim 1, including a time-constant circuit comprising a second resistor and a second condenser, said second condenser being connected between the anode of said rectifier and said terminal and the time constant of said time-constant circuit being not less than the period of said potential sweeps.

3. An electron discharge tube circuit for the generation of linear potential sweeps and abrupt potential steps, comprising an electron discharge tube having at least five electrodes including a cathode, an anode and at least three control electrodes, a first of said control electrodes being nearest said cathode, a second being nearest said anode, and a third being intermediate said first and second control electrodes, a source of space current, a connection from the negative terminal of said source to the cathode of said tube, a condenser having one terminal connected to said anode, a resistor, a connection from the other terminal of said condenser through said resistor to the positive terminal of said source, a connection from said other terminal of said condenser to said first control electrode, a further condenser connected between said second and third control electrodes, a source of firing potential, a rectifier device connecting said source of firing potential to one of the electrodes of said tube, and a source of potential biasing said rectifier device to be normally non-conducting in the absence of firing potential from the said firing source.

4. An electron discharge tube circuit according to claim 3, for use when the source of firing potential provides a negative-going firing pulse, wherein said rectifier device is connected to said anode and is arranged to conduct away from said anode.

5. An electron discharge tube circuit according to claim 3, for use when the source of firing potential provides a positive-going firing pulse, wherein said rectifier device is connected to said third control electrode and is arranged to conduct towards said third control electrode.

6. An electron discharge tube circuit according to claim 3, for use when the source of firing potential provides a positive-going firing pulse, wherein said rectifier device is connected to said second control electrode and is arranged to conduct towards said second control electrode.

7. An electron discharge tube circuit according to claim 3, and including a third condenser connected between said source of firing potential and said rectifier device, and a leak resistor for said third condenser providing a time constant of discharge of said third condenser of not less than the duration of each of said potential sweeps.

8. Circuit according to claim 3 and including a biasing resistor connected between said cathode and said source of space current, and a rectifier having its anode connected to said other terminal of said condenser and its cathode connected to the negative terminal of said source of space current.

BRIAN CLIFFORD FLEMING-WILLIAMS.

REFERENCES CITED

The following references are of record in the file of this patent:

UNITED STATES PATENTS

| Number | Name | Date |
|---|---|---|
| 2,164,968 | Urtel et al. | July 4, 1939 |
| 2,172,746 | Young | Sept. 12, 1939 |
| 2,199,278 | Black | Apr. 30, 1940 |
| 2,270,405 | Black | Jan. 20, 1942 |
| 2,418,538 | Yetter | Apr. 8, 1947 |
| 2,457,974 | Bliss | Jan. 4, 1949 |